United States Patent
Khramov

(10) Patent No.: US 12,247,155 B2
(45) Date of Patent: Mar. 11, 2025

(54) ADDITIVES TO TEMPORARILY REDUCE VISCOSITIES IN OIL-BASED FLUIDS

(71) Applicant: Schlumberger Technology Corporation, Sugar Land, TX (US)

(72) Inventor: Dimitri Khramov, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/539,837

(22) Filed: Dec. 14, 2023

(65) Prior Publication Data

US 2024/0132768 A1 Apr. 25, 2024

Related U.S. Application Data

(62) Division of application No. 17/616,215, filed as application No. PCT/US2020/039374 on Jun. 24, 2020, now Pat. No. 11,879,088.

(60) Provisional application No. 62/867,231, filed on Jun. 27, 2019.

(51) Int. Cl.
C09K 8/035 (2006.01)
E21B 21/06 (2006.01)

(52) U.S. Cl.
CPC .......... C09K 8/035 (2013.01); *E21B 21/068* (2013.01)

(58) Field of Classification Search
None
See application file for complete search history.

(56) References Cited

U.S. PATENT DOCUMENTS

| | | | |
|---|---|---|---|
| 4,200,522 A * | 4/1980 | Dorrepaal | B03D 1/008 209/166 |
| 6,320,065 B1 | 11/2001 | Gruning et al. | |
| 7,036,585 B2 | 5/2006 | Zhou | |
| 8,871,690 B2 | 10/2014 | Patel | |
| 9,637,681 B2 | 5/2017 | Badel | |
| 9,994,761 B2 | 6/2018 | Singh et al. | |
| 11,879,088 B2 * | 1/2024 | Khramov | C09K 8/32 |
| 2007/0173417 A1 | 7/2007 | Kaufman | |
| 2010/0081586 A1 | 4/2010 | Smith et al. | |
| 2015/0021098 A1 | 1/2015 | Kippie | |
| 2016/0068743 A1 | 3/2016 | Cadix et al. | |
| 2017/0313931 A1 | 11/2017 | Chopade et al. | |
| 2018/0244975 A1 | 8/2018 | Khramov et al. | |
| 2018/0244976 A1 | 8/2018 | Cliffe et al. | |
| 2020/0362221 A1 | 5/2020 | Chen | |

(Continued)

FOREIGN PATENT DOCUMENTS

| | | |
|---|---|---|
| WO | 2014167059 A1 | 10/2014 |
| WO | 2015034488 A1 | 3/2015 |

OTHER PUBLICATIONS

Substantive Exam issued in Saudi Arabia Patent Application No. 521431216 dated Mar. 8, 2023, 12 pages with English Translation.

*Primary Examiner* — Andrew Sue-Ako
(74) *Attorney, Agent, or Firm* — Jeffrey D. Frantz

(57) ABSTRACT

Additives configured to temporarily reduce viscosity in oil-based fluids are provided. The additives may be a reaction product of at least one non-ionic additive and at least one acid anhydride of maleic, succinic and/or glutaric acid. The at least one non-ionic additive may be selected from linear or branched alcohols, alcohol ethoxylates, a combination thereof, and/or a derivative thereof.

20 Claims, 1 Drawing Sheet

(56) References Cited

U.S. PATENT DOCUMENTS

2021/0323909 A1 10/2021 Khramov
2022/0251435 A1 8/2022 Khramov

* cited by examiner

ADDITIVES TO TEMPORARILY REDUCE VISCOSITIES IN OIL-BASED FLUIDS

CROSS-REFERENCE TO RELATED APPLICATIONS

The application is a divisional of U.S. patent application Ser. No. 17/616,215, filed Dec. 3, 2021, which is a National Stage Entry of International Application No. PCT/US2020/039374, filed Jun. 24, 2020, which claims priority to U.S. Patent Application No. 62/867,231, filed Jun. 27, 2019. Each of the foregoing applications is incorporated herein by reference.

FIELD OF THE DISCLOSURE

The present disclosure is directed to additives configured to temporarily improve or reduce viscosities in oil-based fluids. The present disclosure is also directed to methods of forming, producing, or providing oil-based fluids comprising the additives. Further, the present disclosure is directed to methods of temporarily improving or reducing viscosities of oil-based fluids by adding or mixing the additives into the oil-based fluids. Still further, the present disclosure is directed to methods of using oil-based fluids having the additives mixed therein and/or injecting, pumping, or circulating oil-based fluids having the additives mixed therein into a wellbore, a borehole, and/or a reservoir of a formation.

BACKGROUND

During the drilling of a wellbore, various fluids are typically used in the well for a variety of functions. The fluids may be circulated through a drill pipe and drill bit into the wellbore, and then may subsequently flow upward through the wellbore to the surface. During this circulation, the drilling fluid may act to remove drill cuttings from the bottom of the hole up to the surface, to suspend cuttings and weighting material when circulation is interrupted, to control subsurface pressures, to maintain the integrity of the wellbore until the well section is cased and cemented, to isolate the fluids from the subterranean formation by providing sufficient hydrostatic pressure to prevent the ingress of formation fluids into the wellbore, to cool and/or lubricate the drill string and bit, and/or to maximize penetration rate when drilling.

In most rotary drilling procedures, drilling fluid takes the form of a "mud," i.e., a liquid having solids suspended therein. The solids function to impart desired rheological properties to the drilling fluid and also to increase the density thereof in order to provide a suitable hydrostatic pressure at the bottom of the well. The drilling mud may be either a water-based or an oil-based mud. As such, the ability to suspend drilling cuttings to reduce wear on the drill bit depends on the rheological properties of the drilling mud related to the viscosity of the drilling fluid.

Drilling muds may consist of additives, polymers, biopolymers, clays and organic colloids added to a base fluid to obtain the desired viscous and filtration properties. Heavy minerals, such as barite or calcium carbonate, may be added to increase density. Solids from the formation are incorporated into the mud and often become dispersed in the mud as a consequence of drilling. Further, drilling muds may be oil-based fluids containing one or more natural and/or synthetic polymeric additives, including polymeric additives that increase the rheological properties (e.g., plastic viscosity, yield point value, gel strength) of the mud, and polymeric thinners or deflocculants and flocculants.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
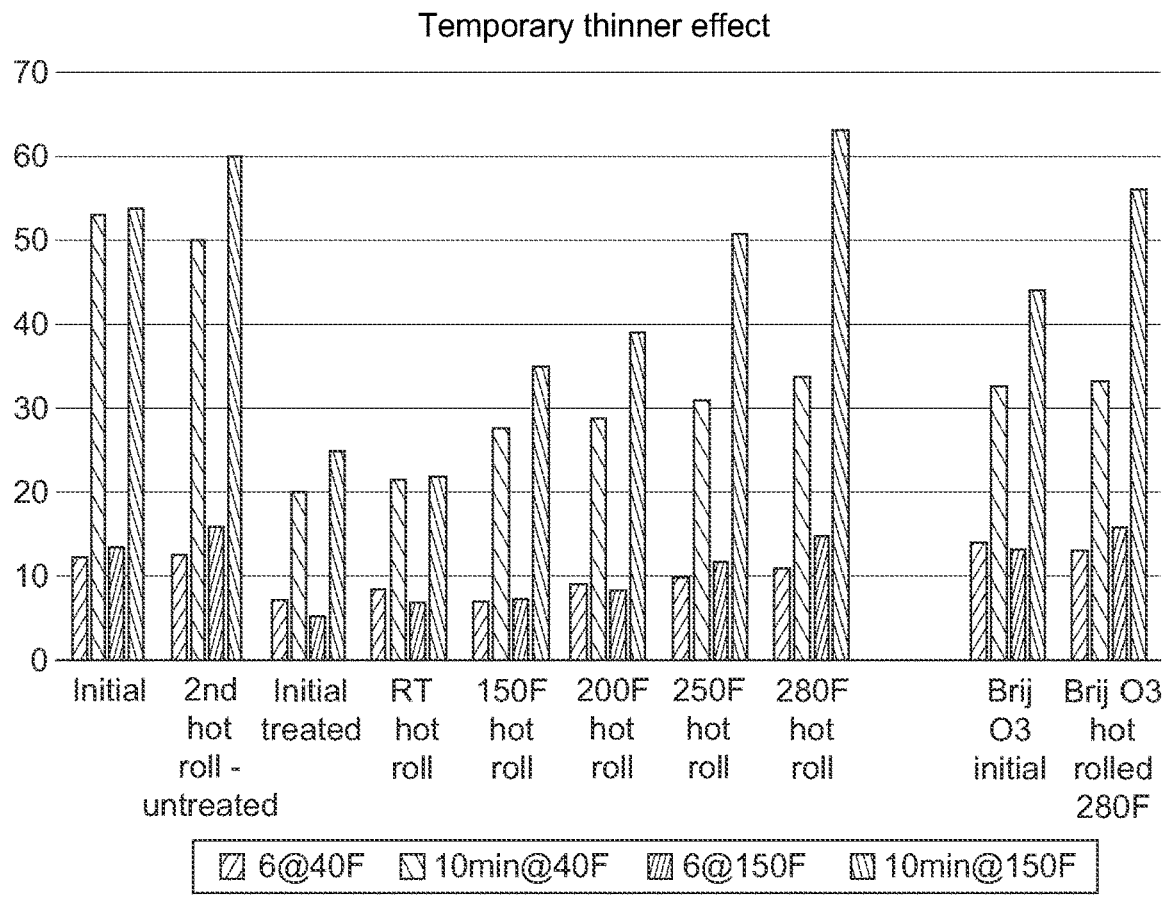
FIG. 1 is a graph illustrating fluid properties utilizing the present additive according to one or more examples of the disclosure.

In the following detailed description, the illustrative embodiments and/or examples described are not meant to be limiting and are for explanatory purposes. Other examples and/or embodiments may be utilized, and other changes may be made, without departing from the spirit or scope of the subject matter presented herein. It will be readily understood that the aspects of the present disclosure, as generally described herein, set forth in the embodiments and/or examples, may be arranged, substituted, combined, and designed in a wide variety of different configurations, each of which are explicitly contemplated and made part of this disclosure.

In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, the embodiments and/or examples herein are intended to be illustrative only and are presented for discussion purposes and not by way of limitation.

The present disclosure is generally drawn to at least one temporary thinning additive (hereinafter "the additive") configured or adapted to temporarily improve and/or temporarily reduce a viscosity of at least one oil-based fluid (hereinafter "the fluid"). The present disclosure is also generally drawn to at least one method of forming, producing, and/or providing the fluid comprising the additive or having the additive mixed therein. Further, the present disclosure is generally drawn to at least one method using the fluid having the additive mixed therein and/or injecting, pumping, or circulating the fluid having the additive mixed therein into a wellbore, a borehole, and/or a reservoir (hereinafter "the wellbore") of a formation.

Generally, the fluid may maintain a certain viscosity profile to perform its intended function. Viscosity is a property of the fluid that indicates its resistance to flow and is measured at varying temperature and pressure, depending on the intended application of the fluid. The fluid, when used in subsea drilling, has a requirement of controlled cold temperature rheology (measured at 40° F.) because this is the temperature that is typically reached by the fluid as heat is lost to the seawater when the fluid travels between the surface and the sea floor. Often, at least one rheology modifier (hereinafter "RM") component or product is added to the fluid to provide high viscosities at low shear rates.

Maintaining appropriate viscosity in the fluid is challenging because one or more thickening components or products in the fluid lose their ability to thicken and the fluid becomes thinner with time and/or temperature. Generally, this is seen as undesirable performance of the fluid, and the effect of thinning is permanent. For example, once a rheology modifier (hereinafter "RM") component or product in the fluid degrades, more RM component or product must be added to the fluid to thicken the fluid which also has one or more detrimental effects on other fluid properties, such as, for example, high shear-rate viscosity (hereinafter "HSRV") and/or high-pressure, high-temperature (hereinafter "HPHT").

Generally, thinning the fluid for lower 3 rpm and/or 6 rpm low shear-rate viscosity (hereinafter "LSRV") is achieved or accomplished by adding a thinner or deflocculant to the fluid to reduce viscosity of the fluid or prevent flocculation. Known thinners include Versathin, Rhethin, and the like. However, this thinning of the fluid is permanent, and fluids with low LSRV are desirable in certain instances but not all instances. For example, fluids with low LSRV may have low equivalent circulating density (hereinafter "ECD") but the fluids have reduced abilities to remove cuttings from the wellbore.

Thus, it is desirable to have the additive configured or adapted to temporarily reduce the viscosity of the fluid during one or more wellbore drilling, constructing, completing, and/or similar known activities.

In one or more embodiments, it may be necessary to add the additive to the fluid on the spot or on the fly, rather than including the additive in the fluid when the fluid is originally formulated. For example, rather than thinning the fluid with the additive based on its original formulation, it may be desirable to add the appropriate amount of the additive on location, on an as needed basis. However, in some environments, such on the spot addition of the additive may be difficult due to the rheology properties of the fluid. In one or more embodiments, the additive may be added in the field to temporarily adjust or reduce viscosity of the fluid, or the fluid may be formulated with the additive to provide a low viscosity fluid initially. When added in the field, the additive may need to be pumpable for ease of addition and handling on site. One or more pour point depressant (hereinafter "PPD") may be necessary when the additive is stored or utilized in cold environments so that the additive is effectively winterized via the PPD. However, the PPD must allow the additive to temporarily reduce the viscosity of the fluid upon addition to the fluid.

Additive Compound

In one or more embodiments, the additive of the present disclosure may be material added to the fluid to temporarily improve, modify, adjust, and/or reduce the viscosity of the fluid. The additive is at least one product produced from or formed by one or more chemical processes and/or reactions (hereinafter "the reaction") of at least one first reactant (hereinafter "the first reactant") and at least one second reactant (hereinafter "the second reactant"). In some embodiments, the additive may be at least one half-ester based on at least one fatty alcohol and at least one acid anhydride of at least one acid. For example, the additive may be an organic compound formed by the reaction of a non-ionic fatty alcohol and an acid anhydride of maleic, succinic and/or glutaric acid, and the organic compound may temporarily reduce the viscosity of the fluid upon addition to the fluid.

In one or more embodiments, the first reactant may be at least one non-ionic long-chain alcohols. In some embodiments, the first reactant may be one or more alcohols and/or one or more alcohol ethoxylates having one or more chain structures and/or degrees of ethoxylation. In other embodiments, the first reactant may be one or more alcohols, one or more alcohol ethoxylates, and/or one or more derivatives thereof. For example, the first reactant may be at least one alcohol, at least one alcohol ethoxylate, or at least one derivative thereof having a total number of carbons and/or a degree of ethoxylation. The total number of carbons of the first reactant may be from about 2 to about 30 carbons, from about 4 to about 26 carbons, from about 6 to about 20 carbons, or about 6 to about 18 carbons. The degree of ethoxylation of the first reactant may be from zero to about 10, from zero to about 8, from zero to about 6, from zero to about 4, or from zero to about 2. In one or more embodiments, the first reactant may be linear or branched alcohol and/or at least one oleyl alcohol, at least one benzyl alcohol, and/or at least one derivative thereof.

In one or more embodiments, the first reactant may be at least one oleyl alcohol and/or at least one derivative of oleyl alcohol. The first reactant may be an unsaturated fatty alcohol, have a molecular formula of $C_{18}H_{36}O$, and/or be produced by hydrogenation of one or more oleic acid esters. The first reactant may be at least one of a non-ionic surfactant, dispersing agent, solubilizer, gelling agent, emulsifier, emollient, and/or a thickener. Further, the first reactant may have or may comprise at least one alkoxy or alkyl group singularly bonded to at least one oxygen of the additive.

The at least one derivative of oleyl alcohol may be free of ethoxy units or may comprise at least about one ethoxy units. In some embodiments, the at least one derivative of oleyl alcohol may have or comprise about 2 ethoxy units, at least about 2 ethoxy units, about 3 ethoxy units, at least about 3 ethoxy units, or more than about 3 ethoxy units. In one or more embodiments, the first reactant may be one or more alkoxylated alcohols, such as, for example, at least oleth-2 or 2-[2-[(Z))-octadec-9-enoxy]ethoxy]ethanol, at least oleth-3 or 2[2-[2-(Z)-octadec-9-enoxy]ethoxy]ethanol (hereinafter "Brij O3"), and/or at least one combination thereof. In some embodiments, the first reactant may have a molecular formula of $C_{22}H_{44}O_3$ or $C_{24}H_{48}O_4$ and/or a molecular weight of at least about 300 g/mol, at least about 350 g/mol, or at least about 400 g/mol.

In one or more embodiments, the first reactant may be at least one linear alcohol, at least one branched alcohol, and/or at least one derivative thereof. In some embodiments, the first reactant may be or may comprise at least one branched alcohol comprising no more than about 30 carbons, no more than about 24 carbons, no more than about 20 carbons, no more than about 18 carbons, or no more than about 14 carbons. In other embodiments, the first reactant may be or may comprise at least about 6 carbons, at least about 8 carbons, at least about 10 carbons, or at least 12 carbons.

In one or more embodiments, the first reactant may be at least one derivative which may be at least one ethoxylate of at least one linear alcohol or at least one branched alcohol. The at least one derivative may have at least about 1 ethoxy unit, at least about 2 ethoxy units, at least about 3 ethoxy units, or no more than about 3 ethoxy units.

In one or more embodiments, the at least one derivative may be formed, produced, and/or provided by at least one chemical reaction that converts a mixture of at least two gases into one or more liquid hydrocarbons. For example, the at least one chemical reaction may be the Fischer-Tropsch process that converts a mixture of at least carbon monoxide and hydrogen into one or more liquid hydrocarbons. In other embodiments the at least one derivative may be formed, produced, and/or provided by at least one organic reaction that converts at least one primary alcohol into at least one dimer alcohol (hereinafter "Fischer-Tropsch alcohol"). For example, the at least one organic reaction may be the Guerbet reaction that converts at least one primary aliphatic alcohol into at least one β-alkylated dimer alcohol (hereinafter "Guerbet alcohol").

In one or more embodiments, the first reactant may be or may comprise at least one linear alcohol, at least one detergent-range or branched alcohol, at least one Fischer-Tropsch alcohol, at least one Guerbet alcohol, and/or at least one derivative thereof. The at least one derivative thereof may be at least one ethoxylate of the at least one linear alcohol, the at least one detergent-range or branched alcohol, the at least one Fischer-Tropsch alcohol, and/or the at least one Guerbet alcohol. The at least one derivative thereof may have at least about 1 ethoxy unit, at least about 2 ethoxy units, at least about 3 ethoxy units, or no more than about 3 ethoxy units.

In one or more embodiments, the first reactant may be or may comprise at least one of oleyl alcohol, oleyl alcohol having 2 ethoxy units, oleyl alcohol having 3 ethoxy units, 2-ethylhexyl alcohol, 2-ethylhexyl cellosolve, 2-ethylhexyl carbitol, hexyl cellosolve, hexyl carbitol, benzyl alcohol having 2 ethoxy units, benzyl alcohol having 4 ethoxy units, at least one linear alcohol, at least one detergent-range or branched alcohol, at least one Fischer-Tropsch alcohol, and/or at least one Guerbet alcohol.

In or more embodiments, the first reactant may be selected from linear and branched alcohols and alcohol ethoxylates with a total number of carbons of 6 to 18 and a degree of ethoxylation of 0 (i.e., original alcohols) to 4. In other embodiments, the first reactant may be an oleyl alcohol (i.e., unsaturated C18 linear alcohol), a benzyl alcohol, and/or a combination or derivative thereof.

In one or more embodiments, the second reactant may be at least one acid anhydride of maleic acid, succinic acid, and/or glutaric acid. For example, the second reactant may be at least one selected from maleic anhydride, succinic anhydride, and glutaric anhydride. Further, the second reactant may have a molecular weight of about 98.057 g/mol, about 107.073 g/mol, or about 114.1 g/mol. In one or more embodiments, the second reactant may be at least one emulsifier. For example, the second reactant may be at least one amidoamine emulsifier. In one or more embodiments, the second reactant may have a molecular weight of greater than about 98 g/mol or less than about 115 g/mol.

A temporary thinning effect may be performed by at least one cleavable ester bond of the additive. When the additive is provided in the fluid, there may be instability of ester at elevated temperatures in the fluid due to hydrolysis. Decomposition of ester may generate components (i.e., the first reactant and the second reactant which may be included in the original formulation of the fluid) that may be already present in the fluid. Therefore, a similar health, safety and environmental (hereinafter "HSE") and/or a materials compatibility profile of the fluid is expected whether the additive is used or not.

In one or more embodiments, the additive of the present disclosure may be half-esters based on maleic anhydride with various alcohols. Different anhydrides, such as, succinic or glutaric anhydrides may also be utilized because the different anhydrides may have similar reactivity to maleic anhydride and the hydrolysis products do not act as thinners themselves. In some embodiments, long chain alkyl-succinic anhydrides may not be suitable because even the hydrolysis products of the long chain alkyl-succinic anhydrides act as thinners; therefore, the temporary thinning effect will not be achievable. Using more complex esters with alcohols may produce the suitable additive. Furthermore, for the present esters to function as thinners, the esters need a free carboxylic group; therefore, at least one polyfunctional acid has to be used to make such ester.

Half-esters of the second reactant with the first reactant may provide the temporary thinning effect and/or the monoester formation may be prepared or achieved by mixing 1:1 molar ratio of the first reactant and the second reactant and applying mild heating.

The additive based on at least one cleavable ester bond as disclosed herein provides temporary thinning effect when added to the fluid. Hydrolysis of at least one ester bond of the additive may deactivate the additive and the fluid may return to baseline properties, which may include an increased or greater viscosity.

A general scheme for synthesis of the additive (i.e., half-ester of alcohol reaction) is shown Eq. (1), wherein the first reactant is oleic alcohol and the second reactant is maleic anhydride.

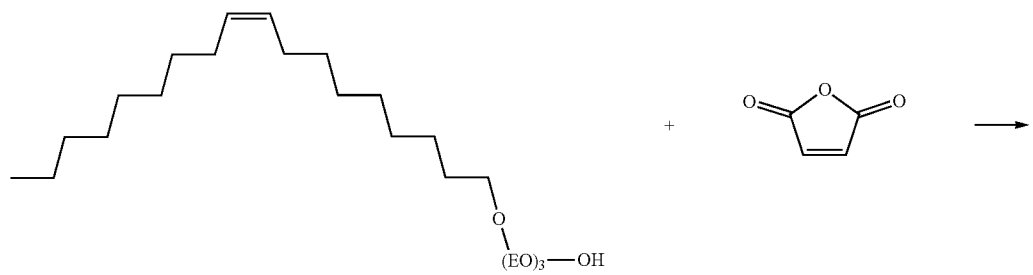

-continued

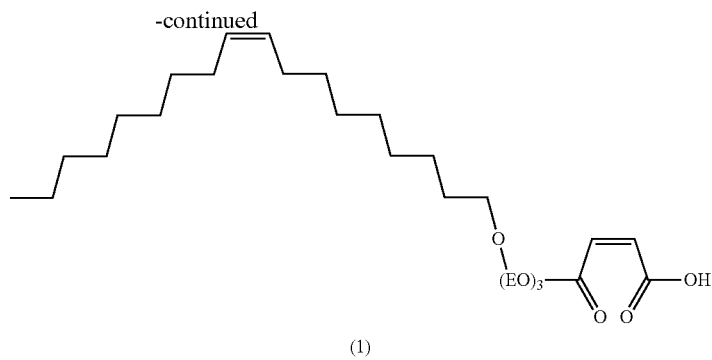

(1)

The reaction of Eq. (1) may be executed or performed with mild temperatures and/or without any solvent. The mild temperatures may be greater than about 50° C., greater than about 55° C., at about 60° C., less than about 65° C., or less than about 70° C. The other alcohols set forth in the present disclosure may follow substantially the same general scheme in Eq. (1) with one or more small differences related to different polarity of the alcohol and solubility of the anhydride in it. Similarly, succinic anhydride or glutaric anhydride reactions to produce the additive may work or execute the same, or substantially the same, as the general scheme in Eq. (1). In one or more embodiments, the additive may be one or more half-esters of intramolecular anhydrides.

In one or more embodiments, the reaction of the first reactant and the second reactant producing or forming the additive may be executed or performed immediately before the additive is added or mixed into the fluid. In some embodiments, the additive may be produced or formed before the additive is introduced into the fluid and the additive may be stored until introduction into the fluid. Introduction of the additive into the fluid may be provided by at least one method or process as known to one of ordinary skill in the art.

In one or more embodiments, the additive may be added at any time to the fluid. That is, the additive may be added to the fluid during initial formulation or as needed during circulation of the fluid downhole, for example, in an amount that may range, for example, from about 1 to about 20 ppb, about 2 to about 15 ppb, about 3 to about 10, or about 4 to about 8 ppb. In some embodiments, the fluid may comprise the additive at a concentration of about 3.0 ppb, less than about 3.0 ppb, or greater than about 3.0 ppb. The addition of the additive in real time during circulation of the fluid may allow for careful control of the amount of the additive being added so that only the minimum amount necessary to achieve the desired viscosity reduction may be added. In one or more embodiments, the additive may be added to the fluid either before or after a hot roll process. In some embodiments, the desired viscosity reduction may be achieved by adding the additive after a hot roll process.

Wellbore Fluids

In one or more embodiments, the fluid disclosed herein may be at least one oil-based wellbore fluid, such as an invert emulsion containing an aqueous discontinuous phase and an oil-based continuous phase. "Invert emulsion," as used herein, is an emulsion in which at least one non-oleaginous fluid is the discontinuous phase and at least one oleaginous fluid is the continuous phase.

"Oleaginous fluid," as used herein, means an oil which is a liquid at about 25° C. and is immiscible with water. Oleaginous fluid may include substances such as hydrocarbons used in the formulation of wellbore fluids such as diesel oil, mineral oil, synthetic oil (including linear alpha olefins and internal olefins, polydiorganosiloxanes, siloxanes or organosiloxanes), ester oils, glycerides of fatty acids, aliphatic esters, aliphatic ethers, aliphatic acetals, or other such hydrocarbons and combinations of these fluids. The concentration of the oleaginous fluid should be sufficient so that an invert emulsion forms. The concentration of the oleaginous fluid may be less than about 99% by volume of the invert emulsion. In one embodiment the amount of oleaginous fluid is from about 30% to about 95% by volume and more particularly about 40% to about 90% by volume of the invert emulsion fluid.

"Non-oleaginous fluid," as used herein, means any substance that is a liquid at 25° C. and that is not an oleaginous fluid as defined above. Non-oleaginous fluid is immiscible with oleaginous liquid but capable of forming emulsions therewith. Non-oleaginous liquids may include aqueous substances such as fresh water, sea water, brine containing inorganic or organic dissolved salts, aqueous solutions containing water-miscible organic compounds, and mixtures of these. The amount of the non-oleaginous fluid is typically less than the theoretical maximum limit for forming an invert emulsion. Thus, the amount of non-oleaginous fluid is less than about 70% by volume. Preferably, the amount of non-oleaginous fluid ranges from about 1% to about 70% by volume, and more preferably from about 5% to about 60% by volume of the invert emulsion fluid.

Suitable oil-based, synthetic-based, and/or oleaginous fluid for use in wellbore fluids of the present disclosure may be a natural and/or a synthetic oil. In one or more embodiments, the oleaginous fluid may be selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, similar compounds known to one of skill in the art, and/or mixtures thereof.

Non-oleaginous fluid may, in some embodiments, include at least one of fresh water, sea water, brine, mixtures of water and water-soluble organic compounds, and mixtures thereof. In various embodiments, the non-oleaginous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates, and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

In one or more embodiments, the oil-based or synthetic-based fluid of the present disclosure may also contain one or more fluid components and/or similar compounds known to one of skill in the art. The one or more fluid components may comprise at least one of at least one emulsifier, at least one viscosifier, one or more organophilic clays, at least one fluid loss control agent, at least one wetting agent, at least one RM, at least one pH control agent, at least one weighting agent, and/or similar fluid components or compounds known to one of skill in the art. These fluid components will be described in greater detail below. Prior to describing the specific fluid components in detail, it should be understood that after addition of the additive described herein, the viscosity of the fluid may be temporarily reduced by the additive. For example, the fluid comprising the additive according to the present disclosure may have a viscosity that is lesser or decreased than the viscosity of the fluid without having the additive mixed therein.

Generally, if the fluid has a higher or too high of viscosity, the viscosity of the fluid could be modified, adjusted or reduced by addition or introduction of the additive into the fluid. However, addition of the additive of the present disclosure into the fluid may also improve, increase, or decrease other rheological properties of the fluid. Thus, the additive of the present disclosure may provide the fluid that has both acceptable viscosity and other rheological properties.

One of the fluid components of the fluid of the present disclosure may be an emulsifier that stabilizes the internal aqueous (non-oleaginous) phase within the external oleaginous fluid to form an invert emulsion. Such emulsifiers may comprise paraffins, fatty-acids, amine-based components, amidoamines, polyolefin amides, soaps of fatty acids, polyamides, polyamines, polyolefin amides, polyolefin amide alkeneamines, alkoxylated ether acids (such as an alkoxylated fatty alcohol terminated with a carboxylic acid), oleate esters, such as sorbitan monoleate, sorbitan dioleate, imidazoline derivatives or alcohol derivatives and combinations or derivatives of the above or the like. Blends of these materials as well as other emulsifiers may be used in the fluid. Examples of such emulsifiers, such as a high internal phase emulsifier, may be SUREMUL PLUS™ (fatty acid based emulsifier) available from MI-SWACO (Houston, TX). In some embodiments, an invert emulsion fluid of the present disclosure may be stabilized by an emulsifier formed from a fatty acid (one or more of a C10-C24 fatty acid, for example, which may include linear and/or branched, and saturated and/or unsaturated fatty acids) reacted with one or more ethyleneamines (e.g., ethylenediamine, diethylenetriamine, triethylenetetraamine, tetraethylenepentaamine) to produce one or more of amides, polyamides, and/or amidoamines, depending, for example, on the mole ratio of the polyamine to the fatty acid. In one or more embodiments, the emulsifier may be a dimer poly-carboxylic C12 to C22 fatty acid, trimer poly-carboxylic C12 to C22 fatty acid, tetramer poly-carboxylic C12 to C22 fatty acid, mixtures of these acids, or a polyamide wherein the polyamide is the condensation reaction product of a C12-C22 fatty acid and a polyamine selected from the group consisting of diethylenetriamine, triethylenetetramine; and tetraethylenepentamine.

While many flat rheology fluids avoid organophilic clays, one or more embodiments of the present disclosure may achieve the flat rheology profile desired while incorporating at least one organophilic clay into the present fluid wherein the fluid is an invert emulsion. An organophilic clay is defined to mean a clay that is treated in any way to have an organophilic coating or surface treatment. In some embodiments, the organophilic clay may be an organophilic sepiolite.

In one or more embodiments, untreated clays, including untreated attapulgite clay and untreated sepiolite clay may also be used as viscosifiers in addition to the organophilic clays. Other viscosifiers and gellants, such as oil soluble polymers, styrene-butadiene block polymers, polyamide resins, polycarboxylic acids and soaps may also be used in addition to the organophilic clays. The total amount of viscosifier used in the fluid may vary depending on downhole conditions, as understood by those skilled in the art. However, normally a total amount of about 0.1% to about 8% by weight range may be sufficient for most applications.

Weighting agents or density materials suitable for use in fluid formulations of the fluid of the present disclosure include, but are not limited to, hematite, magnetite, iron oxides, illmenite, barite, siderite, celestite, dolomite, calcite, manganese oxides, halites and the like. In one or more embodiments, the weighting agents may be coated with a dispersant.

The quantity of the coated or uncoated weighting agent added, if any, may depend upon the desired density of the final composition of the fluid. Weighting agents may be added to result in a final fluid density of up to about 22 pounds per gallon (hereinafter "ppg"). In other embodiments, the weighting agent may be added to achieve a final fluid density of up to about 20 ppg or up to about 19.5 ppg. In one or more embodiments, weighting agents may be added to result in a final fluid density of at least about 10 ppg.

In one or more embodiments, the fluid of the present disclosure may also include at least one particle selected from calcium carbonate or hallyosite. Hallyosite is an aluminosilicate clay that has a tubular morphology. In one or more embodiments, calcium carbonate or hallyosite may be included in the fluid of the present disclosure in amounts between about 5 and about 30 ppb or amounts from about 8 to about 25 ppb.

Optionally, at least one secondary RM may be included in the fluid of the present disclosure to tailor the viscosity to the desired range for the fluid, i.e. flatten the rheological characteristics, of the fluid over a temperature range from about 40° F. to about 150° F. The secondary rheology modifier may be polyamides, polyamines, amidoamines, polyetheramines, or mixtures thereof. Polyamides may be derived from reacting a polyamine with the reaction product of an alcoholamine and a fatty acid, for example. Generally, the alcoholamine-fatty acid reaction is based on a one equivalent of fatty acid for each equivalent of alcoholamine present. This reaction product is then reacted on an about 1:1 equivalent ratio with the polyamine, and then quenched with a propylenecarbonate to remove any free unreacted amines. With respect to the rheology modifier, alcoholamines may be selected from the group consisting of monoethanolamine, diethanolamine, triethanolamine, and mixtures thereof. Fatty acids may include tall oil or other similar unsaturated long chain carboxylic acids having from about 12 to about 22 carbon atoms. The fatty acids may be dimer or trimer fatty acids, or combinations thereof. As previously mentioned, once the alcoholamine has been reacted with the fatty acid, the reaction product is then further reacted with a polyamine. With respect to the rheology modifier, polyamines may be selected from the group consisting of diethylene triamine, triethylene tetramine, tetraethylene pentamine, and combinations thereof. Commercially available rheology modifiers that provide flat rheology wellbore fluids include EMI-1005 (polyamide 40-70%; 2-(2-butoxyethoxy) ethanol 15-40%), available from M-I SWACO (Houston, Tex.), and TECHWAX™ LS-10509 (amidoamine/trimer ace in kerosene) and LS-20509 (polyamidoamine), both available from International Specialty Products (Wayne, N.J.).

In one or more embodiments, the fluid may include an alkali reserve so that the overall fluid formulation is basic (i.e., pH greater than about 7). Typically, this is in the form of lime or alternatively mixtures of alkali and alkaline earth oxides and hydroxides. One of skill in the art should understand and appreciate that the lime content of a well bore fluid will vary depending upon the operations being undertaken and the formations being drilled. Further, it should be appreciated that the lime content, also known as alkalinity or alkaline reserve, is a property that is typically measured in accordance with the applicable API standards which utilize methods that should be well known to one of skill in the art of fluid formulation.

Fluid loss control agents of the fluid may act by coating the walls of the borehole as the well is being drilled. Suitable fluid loss control agents which may find utility in the fluid of the present disclosure include modified lignites, asphaltic compounds, gilsonite, organophilic humates prepared by reacting humic acid with amides or polyalkylene polyamines, and other non-toxic fluid loss additives. Typically, fluid loss control agents are added in amounts less than about 10% or less than about 5% by weight of the fluid.

In one or more embodiments, the first reactant and/or the second reactant may be separately incorporated into the fluid prior to addition of the additive to the fluid. For example, the first reactant and/or the second reactant may be provided in the original formulation of the fluid or during circulation of the fluid prior to the addition of the additive. In some embodiments, the concentration of the first reactant and/or the second reactant in the fluid (before addition of the additive) may be less than about 20 ppb, less than about 15 ppb, less than about 10 ppb, less than about 5 ppb, or less than about 1 ppb.

The method used in preparing wellbore fluids described herein is not critical. For example, conventional methods can be used to prepare the fluid of the present disclosure in a manner analogous to those normally used, to prepare conventional oil-based drilling fluids. In one representative procedure, a desired quantity of oleaginous fluid such as a base oil or synthetic oil and a suitable amount of the fluid components, the first reactant, the second reactant, and/or the additive are added sequentially with continuous mixing. The fluid of the present disclosure may be an invert emulsion and/or may be formed by vigorously agitating, mixing or shearing the oleaginous fluid with a non-oleaginous fluid, the remaining components, and/or the additive.

The fluid disclosed herein may be especially useful in the drilling, completion and working over of subterranean oil and gas wells. In some embodiments, the fluid may be useful in formulating drilling fluids and completion fluids for use in high deviation wells, and long reach wells. Such fluid may be especially useful in the drilling of horizontal wells into hydrocarbon bearing formations. Thus, such fluid, upon the inclusion of the additive, may be pumped into a wellbore and circulated therethrough. Initially or prior to being pumped downhole, the viscosity and/or the other rheological properties of the fluid may be tested, and the additive may be added thereto to tailor the viscosity and/or the other rheological properties to within the desired ranges described herein.

EXAMPLES

The fluid of the present disclosure comprising the additive along with fluid components was prepared according to the fluid formulation as set forth below in TABLE 1. The fluid formulation in TABLE 1 for the examples is non-aqueous or oil-based fluid formulation, wherein the additive produced according to disclosed Eq. (1) was subsequently added after the fluid formulation was initially hot rolled for about 16 hours and select rheology properties were measured as set forth in FIGS. 1 and 2.

TABLE 1

Fluid formulation of the fluid utilized in the examples.

| Treatment | s.g | Vol | | 4.5 |
|---|---|---|---|---|
| IO 1618 (alpha olefin) | 0.78 | 180.8 | 141 | 634.5 |
| EMI-1941 (rheology wellbore fluid) | 0.95 | 7.368 | 7.0 | 31.5 |
| Brij O3 | 0.92 | 3.804 | 3.5 | 15.8 |
| SUREWET (amidoamine based wetting agent) | 0.95 | 0.842 | 0.80 | 3.6 |
| VG 69 (organophilic clay) | 1.6 | 0.313 | 0.50 | 2.3 |
| LIME | 2.34 | 2.137 | 5.0 | 22.5 |
| 25% CaCl2 Brine | 1.23 | 63.09 | 77.6 | 349.2 |
| Duramod (flat rheology system modifier) | 2.4 | 5 | 12.00 | 54.0 |
| ECOTROL RD (methylstyrene/ acrylate copolymer 60-100%; synthetic amorphous silica 1-5%) | 1 | 0.2 | 0.2 | 0.9 |
| Suremod (organic gelling agent) | 0.95 | 2.105 | 2.0 | 9.0 |
| Microbar | 4.15 | 84.82 | 352.0 | 1584.0 |
| API Clay | 2.6 | 5.769 | 15.0 | 67.5 |
| | | 356.2 | 616.6 | |
| s.g | 1.731 | | | |
| MW | 14.42 | | | |
| % oil | 77.00 | | | |
| % water | 23.00 | | | |

Selection of the first reactant and the second reactant for producing the additive may be based on, similar to, and/or associated with one or more of the fluid components of the original formulation of the fluid and/or as set forth in TABLE 1. For example, Brij O3 and maleic anhydride may be selected for the additive because both Brij O3 and maleic anhydride may be fluid components already present in the fluid prior to the introduction of the additive into the fluid. The disclosed formulation in TABLE 1 comprises Brij O3 and maleic anhydride as a fluid component for the fluid. For example, maleic anhydride (or a hydrolyzed version of it) may be present in the formulation of the fluid as an amidoamine emulsifier. Therefore, adding the additive (i.e., a temporary thinner product) produced in accordance with disclosed Eq. (1) does not introduce any new fluid byproducts components after hydrolysis of the additive that were not already present in the fluid as originally formulated.

The temporary thinner effect of the additive and the proof that the thinner effect of the additive is temporary is shown in FIG. 1. The fluid was initially hot rolled for 16 hours and select properties set forth in FIG. 1 were measured (hereinafter "initial fluid"). Then 3 ppb of the additive, produced from the reaction of the first and second reactants in accordance with Eq. (1), was added to a barrel of the initial fluid and the select properties were measured again to see if there was the thinning effect provided by the additive. Results in "initial treated" show reduction in LSRV and gels meaning that thinning effect in the fluid was achieved by addition or introduction of the additive into the initial fluid. At this point, the fluid was hot rolled at different temperatures to determine when hydrolysis of the additive occurs and when the thinning effect of the additive stopped or terminated. Gradual increase in LSRV and gels is shown progressing from almost unchanged (RT, 150° F. hot roll) to nearly full restoration of properties after 280° F. hot roll. Since after hydrolysis of the additive, the resulting byproducts of the additive were Brij O3 and maleic acid (as calcium salt). A control experiment was conducted when treatment with 3 ppb of Brij O3 was performed. Initial, after treatment with Brij O3, properties are shown (see second group from the righthand side of FIG. 1) and after hot roll (see rightmost group of FIG. 1) which show that properties of Brij O3 treated fluid were nearly identical to properties of fluid that was initially treated with specially designed thinner and then hot rolled at 280° F.

Figure 2:
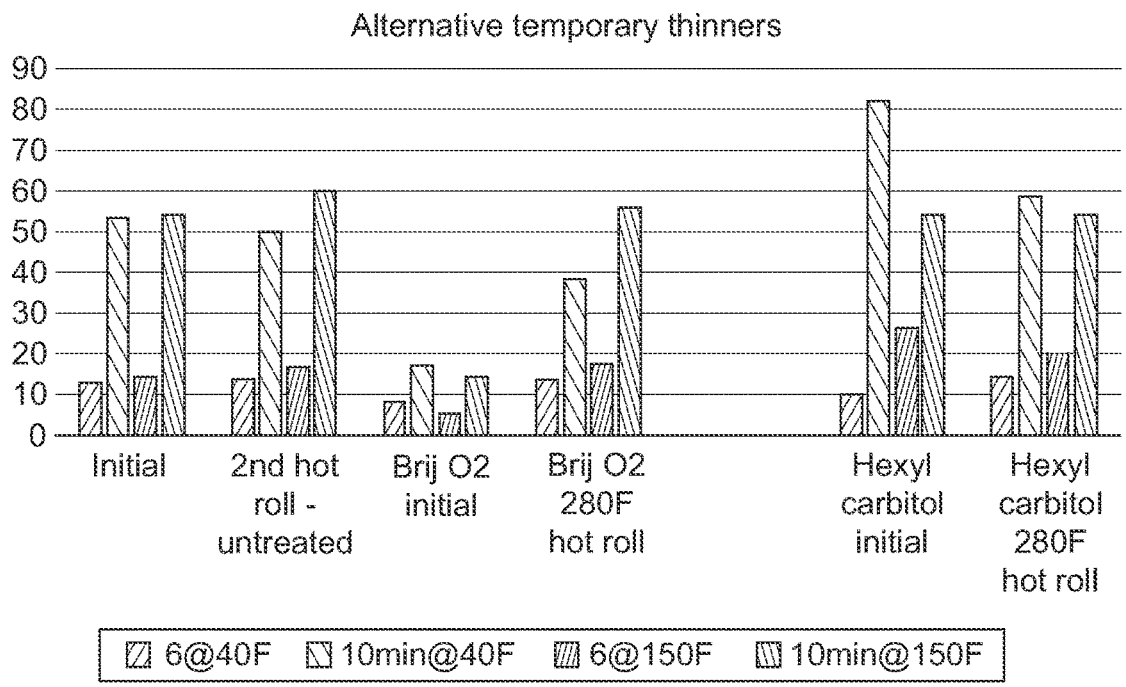
FIG. 2 is a graph illustrating fluid properties utilizing the present additive in comparison to untreated fluid according to one or more examples of the disclosure.

Besides Brij O3-maleic anhydride additive, other alternatives may work, such as, for example, Brij O2-maleic anhydride (as first and second reactants) additive as shown in the middle of FIG. 2. In an example, hexyl carbitol was the first reactant; however, when hexyl carbitol was reacted with maleic anhydride, no thinner effect may be achieved as shown in the two groups on the right of FIG. 2.

Initial and after hot roll figures for the additive formed from the Brij O2-maleic derivative may be similar or substantially similar to effects described for the additive formed from Brij O3-maleic anhydride. Strong initial thinning and then effect disappearing after hot roll at 280° F. is achievable because of hydrolysis of the additive. However, effect before hot roll and after hot roll for the additive formed from hexyl carbitol-maleic anhydride derivative may be small because even initially hexyl carbitol-maleic anhydride reaction product may provide minimal or no effective thinner.

As shown in the data of FIGS. 1 and 2, the additive (i.e., temporary thinner) based on half-ester of Brij O3 with maleic anhydride performs well or substantially well. The additive performs its intended function, the effect is shown to be temporary and, upon degradation, this chemistry of the additive does not introduce any decomposition byproducts into the fluid that are not already there. Final resulting rheology after the temporary thinner effect of the additive stops working or terminates is slightly lower than original rheology because of general thinning effect of Brij O3. In one or more embodiments, at least one of alternative glycols reacted with maleic/succinic/glutaric anhydrides may provide "post hydrolysis" fluid with rheology that may be the same or substantially the same as the rheology of the initial fluid.

In embodiments, an additive comprising a reaction product of a first reactant and a second reactant may be provided. The reaction product may comprise at least one cleavable ester, the first reactant may be one selected from at least one alcohol, at least one alcohol ethoxylate, and at least one combination thereof, the second reactant may comprise at least one anhydride, and/or a temporary thinning effect of the additive may be deactivatable by hydrolysis of at least one ester bond of the reaction product.

In an embodiment, the first reactant may be one selected from at least one linear alcohol, at least one branched alcohol, and at least one alcohol ethoxylate, may have a total number of carbons of 6 to 18, and/or may have a degree of ethoxylation of 0 to 4.

In an embodiment, the first reactant may be one selected from an oleyl alcohol, a benzyl alcohol, a combination thereof, and a derivative thereof.

In an embodiment, the second reactant may have a molecular weight of greater than about 98 g/mol and less than about 115 g/mol.

In an embodiment, the reaction product may be at least one half-ester of at least one intramolecular anhydride.

In an embodiment, the at least one anhydride may be one selected from the group consisting of maleic anhydride, succinic anhydride, glutaric anhydride, and at least one combination thereof.

In embodiments, a method is provided that may comprise providing a base fluid having a first viscosity and reducing the first viscosity of the base fluid to a second viscosity of the base fluid for a time duration by adding at least one thinning additive to the base fluid. The at least one thinning additive may comprise at least one cleavable ester bond.

In an embodiment, the method may comprise hydrolyzing the at least one cleavable ester bond during or after the time duration.

In an embodiment, the method may comprise increasing the second viscosity of the base fluid to a third viscosity of the base fluid by deactivating the at least one thinning additive, wherein the third viscosity is less than or equal to the first viscosity of the base fluid.

In an embodiment, the method may comprise hydrolyzing the at least one cleavable ester bond such that a temporary thinning effect of the at least one thinning additive is deactivated by hydrolysis of the at least one cleavable ester bond.

In an embodiment, the at least one thinning additive may be one or more half-esters of one or more intramolecular anhydrides based on at least one of maleic anhydride, succinic anhydride, glutaric anhydride, and at least one combination thereof.

In an embodiment, the method may comprise reacting a first reactant and a second reactant to produce the at least one thinning additive before the at least one thinning additive is added to the base fluid, wherein the first reactant is one selected from at least one alcohol, at least one alcohol ethoxylate, and at least one combination thereof and the second reactant comprises at least one anhydride.

In an embodiment, the at least one anhydride may be one selected from maleic anhydride, succinic anhydride, glutaric anhydride, and at least one combination thereof.

In an embodiment, the first reactant may have a total number of carbons of 6 to 18 and/or a degree of ethoxylation of 0 to 4.

In embodiments, a method is provided that may comprise mixing at least one additive and a base fluid to form a wellbore fluid such that a viscosity of the wellbore fluid is reducible by a temporary thinning effect of the at least one additive and introducing the wellbore fluid into a wellbore through an earthen formation. The base fluid may comprise at least one of an oil-based fluid, a synthetic-based fluid, and at least one combination thereof, and the at least one additive may comprise one or more half-esters of one or more intramolecular anhydrides.

In an embodiment, the method may comprise increasing the viscosity of the wellbore fluid by deactivating the temporary thinning effect of the at least one additive.

In an embodiment, the method may comprise reacting at least one alcohol and/or at least one alcohol ethoxylate with at least one anhydride to produce the at least one additive before the at least one additive is mixed with the base fluid, wherein the at least one anhydride is selected from the group consisting of maleic anhydride, succinic anhydride, glutaric anhydride, and at least one combination thereof.

In an embodiment, the one or more half-esters of one or more intramolecular anhydrides may be based on at least one anhydride having a molecular weight of greater than about 98 g/mol and less than about 115 g/mol.

In an embodiment, the one or more half-esters of one or more intramolecular anhydrides may be based on at least one selected from linear alcohol, at least one branched alcohol, and at least one alcohol ethoxylate having a total number of carbons of 6 to 18 and/or a degree of ethoxylation of 0 to 4.

In an embodiment, the one or more intramolecular anhydrides may be one selected from maleic anhydride, succinic anhydride, glutaric anhydride, and at least one combination thereof.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A wellbore fluid comprising:
a base fluid comprising an oil-based fluid wherein the oil-based fluid is an invert emulsion containing an aqueous discontinuous phase and an oil-based continuous phase; and
an additive comprising:
a reaction product of a first reactant and a second reactant;
the reaction product comprising at least one cleavable ester;
the first reactant is at least one alcohol, at least one alcohol ethoxylate, or at least one combination thereof, wherein the at least one alcohol is at least one of oleyl alcohol, 2-ethylhexyl alcohol, 2-ethylhexyl cellosolve, 2-ethylhexyl carbitol, hexyl cellosolve, at least one linear alcohol, at least one branched alcohol, at least one Fisher-Tropsch alcohol, or at least one Guerbet alcohol, and wherein the at least one alcohol ethoxylate is at least one of oleyl alcohol having 2 ethoxy units, oleyl alcohol having 3 ethoxy units, benzyl alcohol having 2 ethoxy units, or benzyl alcohol having 4 ethoxy units;
the second reactant comprising at least one anhydride; and
a temporary thinning effect of the additive in the oil-based fluid being deactivatable by hydrolysis of at least one ester bond of the reaction product.

2. The wellbore fluid of claim 1, wherein the first reactant is the at least one linear alcohol, the at least one branched alcohol, or the at least one alcohol ethoxylate, has a total number of carbons of 6 to 18, and/or has a degree of ethoxylation of 0 to 4.

3. The wellbore fluid of claim 1, wherein the first reactant is the oleyl alcohol, the benzyl alcohol having 2 ethoxy units, the benzyl alcohol having 4 ethoxy units, or a combination thereof.

4. The wellbore fluid of claim 1, wherein the second reactant has a molecular weight of greater than about 98 g/mol and less than about 115 g/mol.

5. The wellbore fluid of claim 1, wherein the reaction product is at least one half-ester of at least one intramolecular anhydride.

6. The wellbore fluid of claim 1, wherein the at least one anhydride is one selected from the group consisting of maleic anhydride, succinic anhydride, glutaric anhydride, and at least one combination thereof.

7. The wellbore fluid of claim 1, wherein the first reactant is oleyl alcohol.

8. The wellbore fluid of claim 7, wherein the oleyl alcohol has 2 ethoxy units or 3 ethoxy units.

9. The wellbore fluid of claim 8, wherein the second reactant is maleic anhydride.

10. The wellbore fluid of claim 1, wherein the first reactant is at least one of 2-ethylhexyl alcohol, 2-ethylhexyl cellosolve, hexyl cellosolve, or 2-ethylhexyl carbitol.

11. The wellbore fluid of claim 10, wherein the second reactant is maleic anhydride.

12. The wellbore fluid of claim 1, wherein the first reactant is the benzyl alcohol having 2 ethoxy units.

13. The wellbore fluid of claim 1, wherein the first reactant is the benzyl alcohol having 4 ethoxy units.

14. The wellbore fluid of claim 1, wherein the first reactant is the at least one linear alcohol or the at least one branched alcohol.

15. The wellbore fluid of claim 1, wherein the additive is present in the wellbore fluid at a concentration in a range from about 1 ppb to about 20 ppb.

16. The wellbore fluid of claim 1, wherein at least one non-oleaginous fluid is the aqueous discontinuous phase and at least one oleaginous fluid is the oil-based continuous phase.

17. The wellbore fluid of claim 16, wherein an amount of the at least one oleaginous fluid is from about 30% to about 95% by volume of the invert emulsion.

18. The wellbore fluid of claim 16, further comprising:
an emulsifier that stabilizes the at least one non-oleaginous fluid within the oleaginous fluid.

19. The wellbore fluid of claim 16, further comprising:
at least one organophilic clay.

20. The wellbore fluid of claim 1, wherein the reaction product is formed a temperature greater than about 50° C. and less than about 70° C.

* * * * *